Oct. 10, 1961  R. A. S. TEMPLETON  3,003,249
TREATMENT OF PRODUCTS AND MATERIALS
Filed May 1, 1958
5 Sheets-Sheet 2
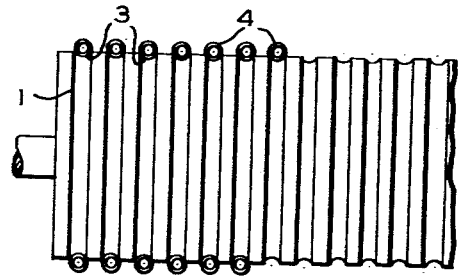
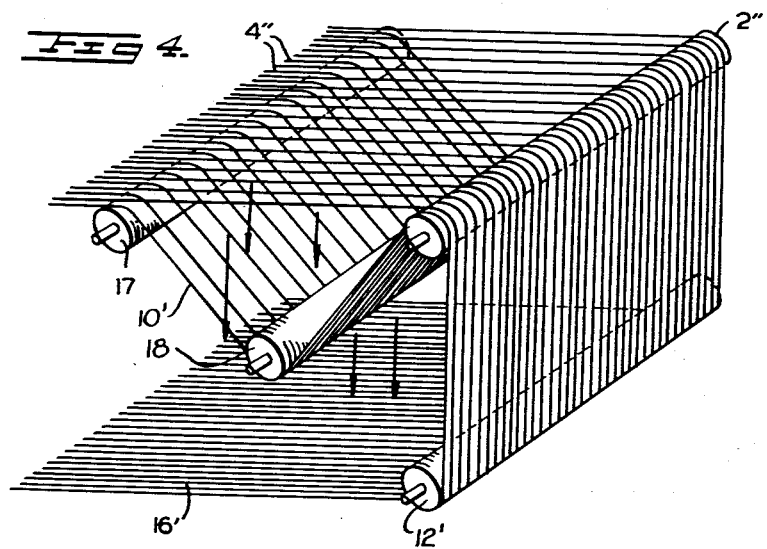
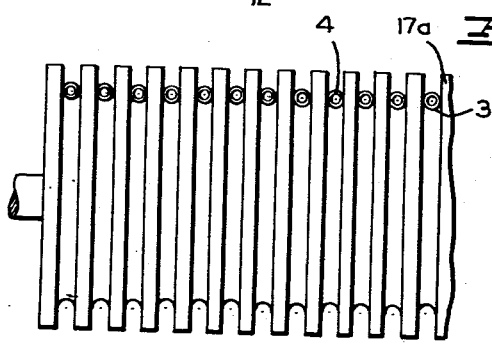
INVENTOR.
ROBERT A.S. TEMPLETON
BY
ATTORNEYS

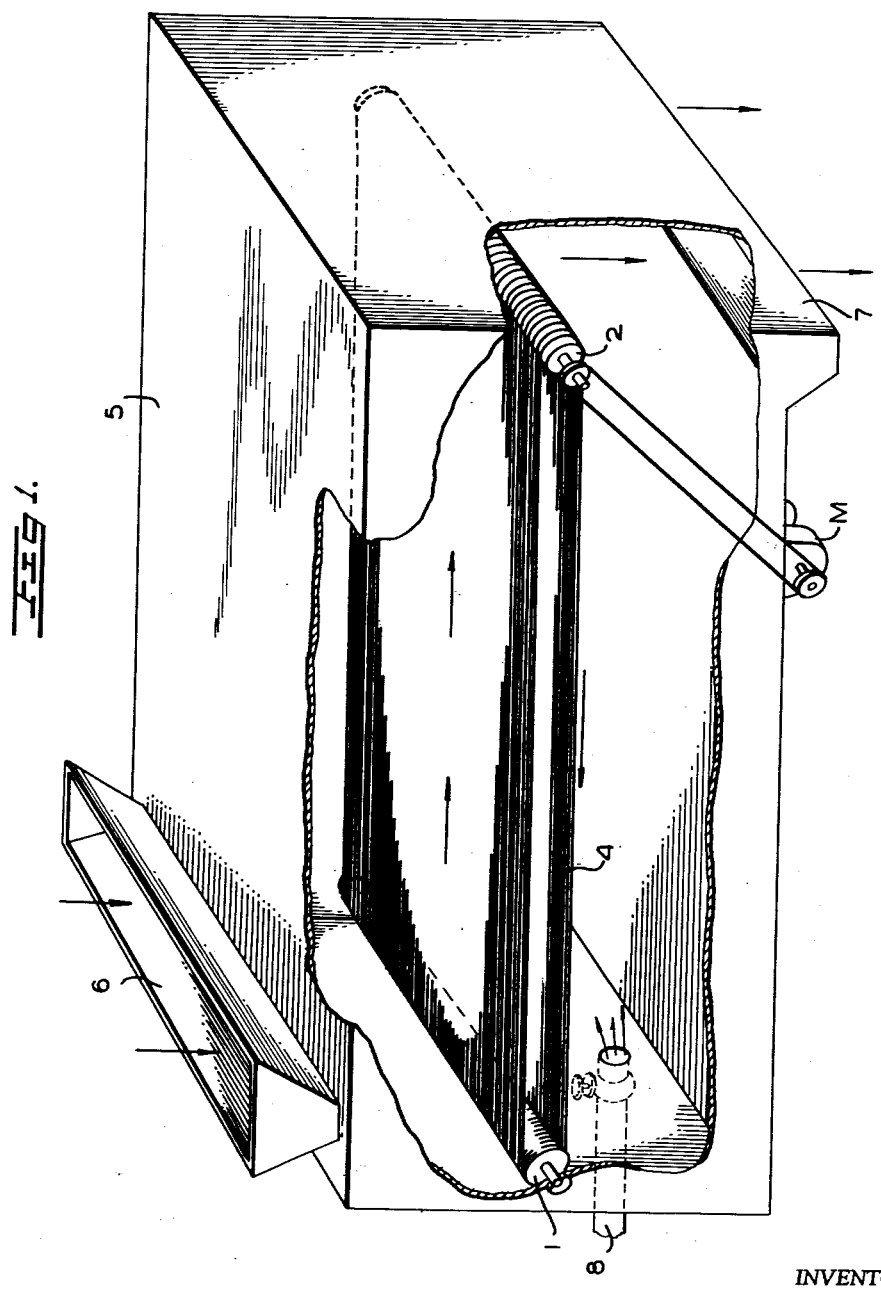

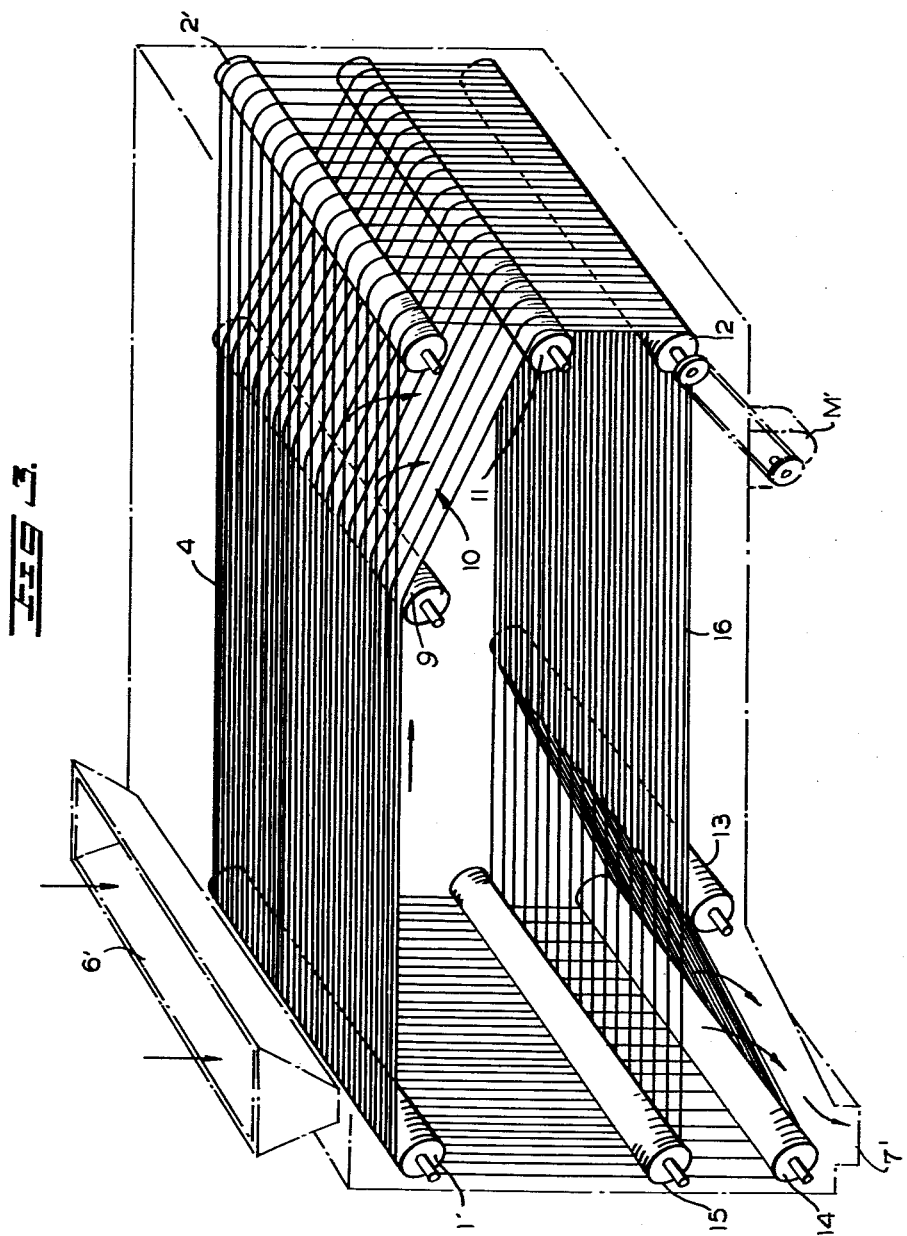

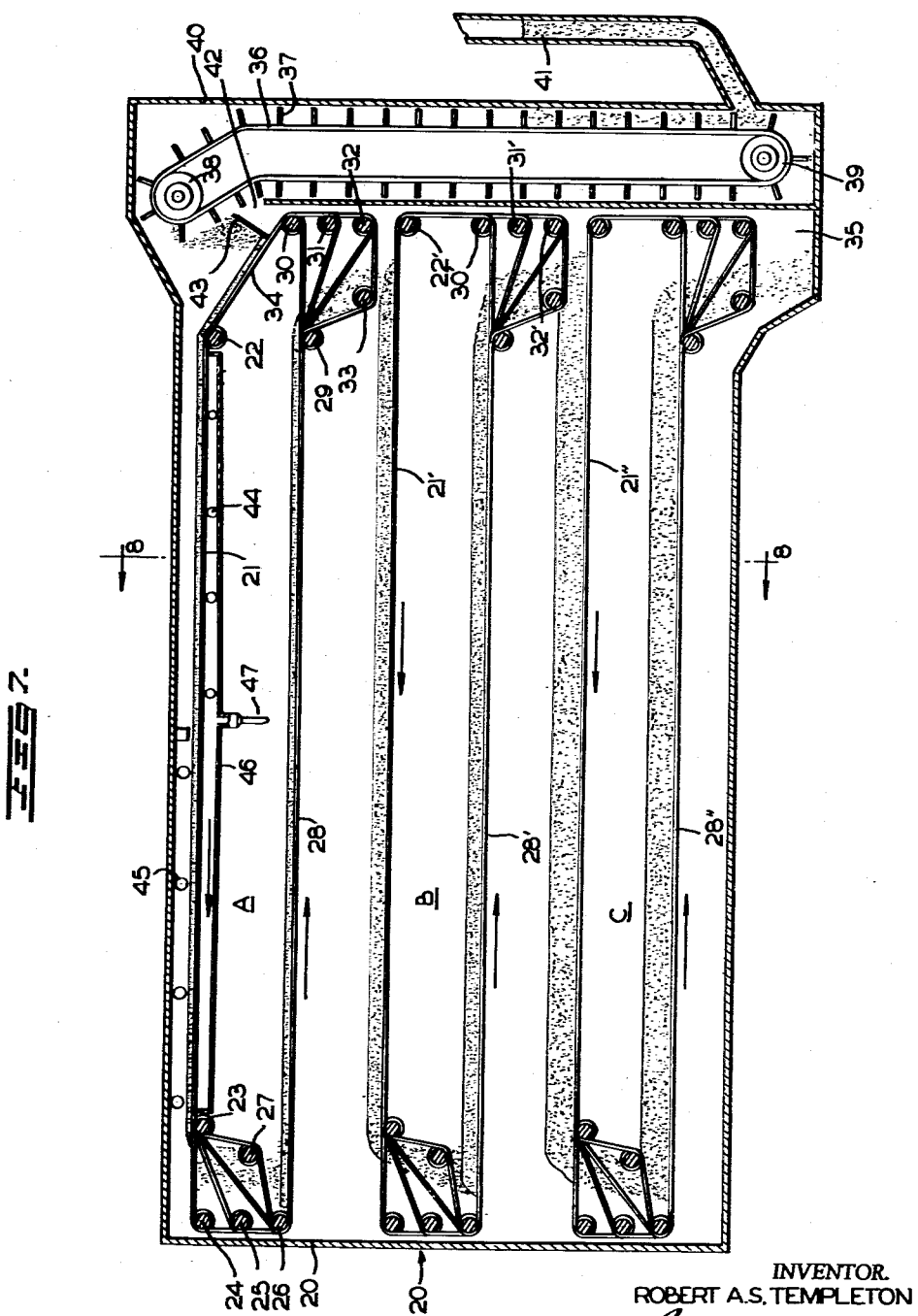

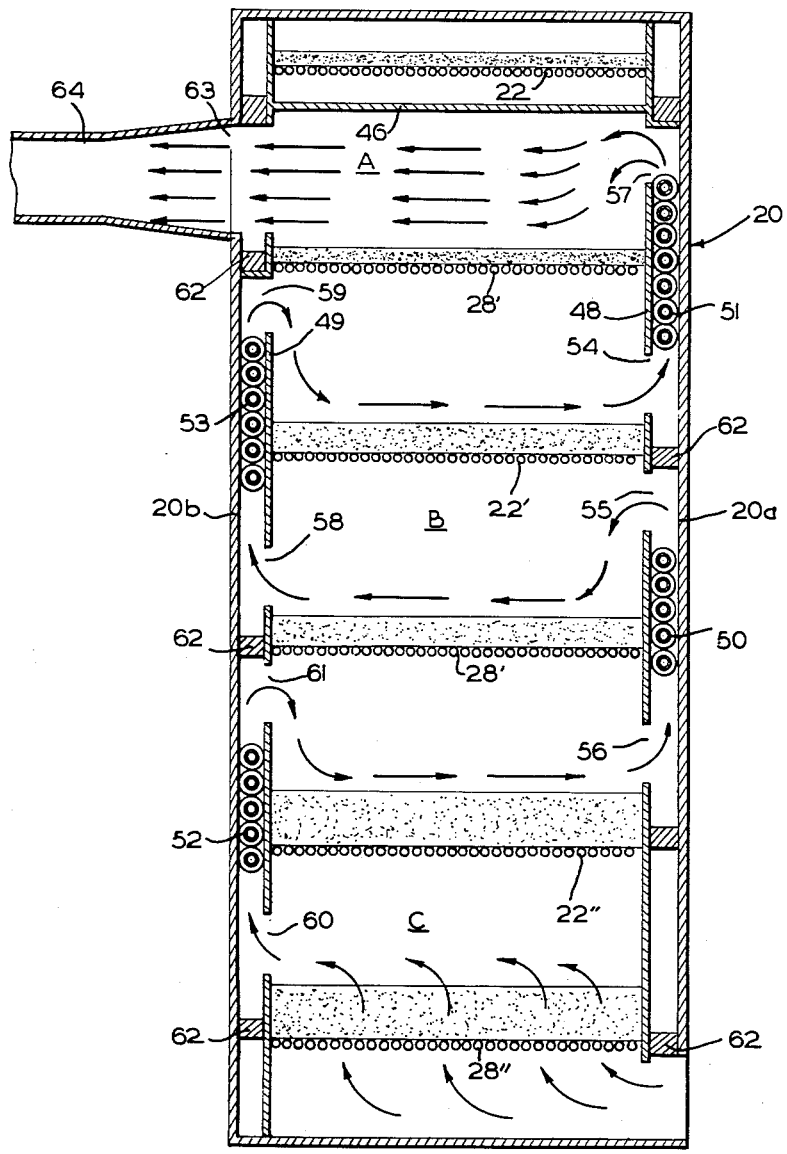

United States Patent Office 3,003,249
Patented Oct. 10, 1961

3,003,249
TREATMENT OF PRODUCTS AND MATERIALS
Robert Alexander Spencer Templeton, Tatmore Place, Hertfordshire, Gosmore, Hitchin, England
Filed May 1, 1958, Ser. No. 732,210
11 Claims. (Cl. 34—208)

This invention relates to a method and apparatus for the treatment of discrete particles of material where it is desired to change their physical state by treatment with a fluid. It is particularly applicable to the treatment of fruits, vegetables and other food materials where the food material, in the form of slices or pieces, is treated while being moved along a predetermined path by a gas-permeable conveyor. The treatment may be one of blanching, heating, cooking, drying, cooling or freezing, rehydration, or any other treatment in which the material is treated with a gas or other fluid while it is in the form of discrete particles.

One of the main difficulties heretofore encountered in the treatment of material is the changing of the position of the material so that new surface portions will be presented to the treating fluid for more rapid absorption of heat, as when the material is being blanched, heated or cooked, or for the extraction of heat, as when it is being cooled or frozen, or for the vaporization of moisture, as when it is being dried, or for the absorption of water as when it is being rehydrated In all these processes, and in others applicable to products and materials other than fruit and vegetables, it has been exceedingly difficult to devise mechanical means such that the surfaces of the product or material under treatment shall be a maximum and, if possible, so that the product or material will be in changing association with the operating medium, for example air or steam, whether it be for the absorption or removal of heat or water.

The reasons underlying this difficulty are as follows.

Mechanical applications generally require some form of conveyance, oftentimes a perforated band or a rotating cylinder. In the case of a perforated band, the perforations, in practice, cannot be much in excess of 50% of the surface of the band, and are often much less, with the result that the product tends to lose contact with the operating medium at the points of its contact with the solid areas, and the material tends to adhere thereto. This causes distribution of the operating medium and the effectiveness of the operation to be impaired and reduces its efficiency and impairs the quality of the final product. For example, there will be particles over or underblanched, over or undercooked, over or underdried, or underfrozen, and in consequence the operation must be continued for such a time, perhaps two or three times as long as is theoretically necessary, in order to assure that every part of the material is blanched or heated, or cooked, or dried, or cooled, or frozen, or rehydrated.

Likewise, where conveyance is obtained by means of, for example, a rotating cylinder, while this may overcome some of the disadvantages mentioned in the case of a traveling band, the rubbing or abrasion of the surface of the material when moved in such a rotating cylinder creates special difficulties of breakdown of the structure of the pieces into liquids or powders, or into altered and undesirable shapes. Further, in operation of, for example, blanching and cooking, where the medium for the supply of heat is water or steam, considerable leaching losses of the soluble nutrients occur from the surfaces of the slices or pieces of fruits or vegetables either into the hot blanching water or into the water formed by condensation of the steam, and the more the product is disturbed by movement the greater will these leaching losses tend to be.

I have found that the use of a means of conveyance of the material which will afford a much smaller obstruction to the free movement of the operating medium in relation to the surface of the product will overcome the above and other difficulties. I have also found it desirable to provide, additionally, for occasional disturbance of the product so as to change its surfaces in relation to the operating medium in such a way that undue rubbing, or breakdown, or leaching is avoided.

In order to secure these advantages, I have provided according to the present invention, a conveyor device, which may be for example, the principal member of a blancher, or a cooker, or a dryer, or a freezer, comprising a plurality of spaced endless independent strands disposed side-by-side and maintained in relatively close parallel relation. The endless strands, which may conveniently be of wire, preferably coiled wire, may be trained around at least a pair of spaced rollers or shafts whose longitudinal axes are disposed at right angles to the strands, and the gaps between the independent strands, may be controlled by annular serrations or grooves upon the face of the rollers or shafts and varied either by altering the diameters of the independent strands or the spacing of the serrations or grooves.

The invention also contemplates the use of such a conveyor device as a part of an apparatus in which the material is subjected to other treatments. Thus, the conveyor may form a part of an apparatus in which material is first blanched and cooled, and then caused to travel along a plurality of the conveyors, arranged in series, where it is subjected to drying, and, finally to a cooling operation before discharge.

In order that the present invention may be more clearly understood, reference may now be had to the accompanying drawings illustrating, by way of example, a preferred form of the apparatus of the invention. In the drawings:

FIG. 1 is a diagrammatic view of one form of apparatus according to the present invention, FIG. 2 is a detailed view of a part of one of the rollers employed in the apparatus of FIG. 1, FIG. 3 is a diagrammatic view of a modified form of apparatus according to the present invention, FIG. 4 is a diagrammatic view illustrating a further modification, FIG. 5 is a diagrammatic view illustrating one form of intermediate roller, FIG. 6 is a view, on an enlarged scale, of a coiled form of strand, FIG. 7 is a diagrammatic, longitudinal sectional view, of a blanching drier and cooler embodying a conveyor or device of the general type shown in FIG. 3, and FIG. 8 is a cross-sectional view taken on line 8—8 of FIG. 7.

As shown in FIGS. 1 and 2 the conveyor comprises a pair of spaced rollers 1 and 2 each provided with a series of spaced annular serrations or grooves 3 in its surface in which a plurality of spaced endless independent strands 4 are seated.

The axes of the rollers 1 and 2 are disposed parallel to one another and the size and spacing of the serrations or grooves in each roller are the same so that endless strands embracing both rollers and seating in corresponding serrations or grooves in the two rollers will be maintained in parallel relation.

The conveyor is located in a chamber 5 and material to be treated may be fed onto one end of the conveyor by gravity, as from a hopper 6 and discharged from the chamber 5 adjacent the other end of the conveyor through suitable discharge means 7. A medium for treating the material on the conveyor may be fed into the chamber 5 through a valved pipe 8, and if desired, other means, not shown, may be provided for removing the medium or any excess thereof from the chamber.

One or both rollers 1 and 2 may be positively driven through belt and pulley means from a suitable power source such as the motor M, so that the wires are continually in motion and any material fed onto one end of the conveyor for treatment is moved progressively to the other end of the conveyor where it is deposited on the floor of the chamber or discharged directly through the discharge means 7.

The gaps between the strands 4 may be varied to suit different products to be treated either by substituting for strands of one diameter strands of a different diameter on the same rollers, or by replacing one set of rollers by others having serrations or grooves of different sizes or spacing, while still using the same diameter strands.

In the case of strands of coiled wire, such as shown in FIG. 6, for example, of one-eighth inch diameter arranged to run in serrations such as to produce a gap between the strands of one-eighth inch, fruit or vegetable pieces of greater dimensions than one-eighth inch will be conveniently carried, but will expose to the operating medium their surface in much greater percentage than heretofore, and the obstruction to the movement of the operating medium will be similarly reduced. In the case of strands made of coiled wire, the obstruction instead of being as much as 50%, as in many traditional machines, will be reduced to as little as 20% or less, because the wires themselves will permit movement of the operating medium between their coils as well as through the gaps between adjacent wires.

The use of strands made from coiled wire has the further advantage that there is less sticking of the material to the strands in that the parallel strands do not move along at a constant speed, but rather move along with a jerky movement, comparable roughly to the manner in which a snake crawls. This causes relative movement between opposite portions of adjacent strands which prevents sticking of the material to the strands.

My invention may be more easily understood if the conveyor be likened to a moving mattress of individual strands similar, as for example, to the wires of a grand-piano, that is to say, uniformly spaced from one another and so tensioned over the rollers conveying the movement as to provide a level or inclined conveyor of minimum obstruction to the medium operating upon the product in the course of its conveyance.

In order to provide for disturbance of the product at intervals, the capability of the individual strands to move in different directions may be used. For example, in the case of a mattress of wires of one-eighth inch diameter gaps between them, alternate wires may be deflected out of the plane of the remainder of the wires and later rejoin their companion wires thus to make again the same or a similar mattress returning on an underpass, now once more carrying the product under treatment which will have been disturbed and altered in its surfaces available to the operating medium as a result of naturally falling between the gaps enlarged from one-eighth inch to three-eighths inch before being re-caught on the mattress of one-eighth inch gaps on the underpass.

FIGS. 3 and 4 illustrate diagrammatically alternative forms of conveyors of the kind just described. As shown in FIG. 3 the upper pass of the mattress of strands 4 is caused to pass over a serrated or grooved roller 9 disposed in a convenient position intermediate the rollers 1' and 2'. To the right of the roller 9 every alternative strand 4 is deflected downwardly, as shown generally at 10, to pass over a serrated or grooved roller 11, while the other strands continue on and pass over the roller 2'. The two groups of strands join the same path again at the roller 11 and then pass together around a roller 12, driven by belt and pulley means from a motor M', and over the roller 13. After passing the roller 13 alternate strands are deflected downwardly around the roller 14 while the remaining strands continue in the same plane as shown and around the roller 15, when the two groups of strands reunite and then pass back to the roller 1'.

In the alternative form shown in FIG. 4, the same result as that obtained with the apparatus of FIG. 3 may be secured by the provision of rollers 17 and 18 disposed as shown. In this figure every alternate strand of mattress 4'', on passing over the grooved or serrated roller 17, is deflected downwardly to pass around the grooved or serrated roller 18, while the other strands continue on their course to pass over grooved or serrated roller 2''. The deflected strands, shown at 10', after passing around roller 18, pass upwardly and over the roller 2'' where they rejoin the other strands. The re-united strands then pass downwardly and around the roller 12' to form the lower mattress 16', similar to the mattress 16 of FIG. 3. The path of the strands from there on is the same as in FIG. 3.

In the operation of each of the modifications shown in FIGS. 3 and 4, the material in the form of particles having a dimension less than three eighths inch in one direction, but greater than one-eighth inch in all directions, is fed onto the supply end of the upper pass 4 or 4'' by gravity from a supply hopper and move along that pass in a substantially undisturbed state, while being subjected to the action of the operating medium, until the particles reach the rollers 9 or 17, where the alternate strands are deflected from the plane of the mattress of strands. This deflection of the alternate strands causes the separation of the strands from one another to be increased from one-eighth inch to three-eighths inch. This increase in the spacing of the strands causes the material to fall by gravity through the spaces between the strands onto the lower mattress 16 or 16'. This falling of the particles of the material causes them to be re-united so that in forming a bed on the lower mattress different surfaces are presented to the operating medium. The particles on the lower mattresses are then carried along to the left until they reach the roller 13, FIG. 3, or a corresponding roller of FIG. 4, where the alternate strands again are deflected to increase the spacing between them, whereupon the particles fall through the strands to the discharge hopper 7', which discharges them from the apparatus.

In pursuit of this great advantage of maximum but nevertheless gentle disturbance of the product under treatment one or more fluted rollers may be so arranged at intervals along the length of the conveyor so that, as the mattress of wires passes through or over the roller or rollers, the flutes which extend beyond the wires peripherally of the roller, will tend to lift and change the exposed surface of the material on the mattress of wires.

FIG. 5 illustrates diagrammatically a roller of this kind, where the annular portions or flutes 17$^a$, project through the mattress to disturb the material during opperation of the conveyor.

A battery of several such stranded mattresses may be mounted one over the top of the other, so as to secure a series of distrurbances and a series of heating or cooling operations in the manner described. For example, the first moving mattress may be devoted to the blanching of fruit or vegetable or other material, both in forward and return movement, whence the blanched material may be dropped by the enlargement of gaps in the manner described, by gravity, to the next moving mattress which may operate as a cooler in both outward and return movement before the material is dropped again on to another mattress operating as a dryer in both movements, and so on, to a final mattress which may be operated as a cooler. Alternatively, the order may be revised and the step of freezing and/or thawing may be used between the steps of cooking and drying.

An apparatus of the kind just referred to is illustrated in FIGS. 7 and 8. Referring to these figs., a plurality of conveyor units A, B and C, similar to those shown in FIGS. 3 and 4, are arranged in superposed relation in a combined blanching, cooling and drying chamber 20. As in the foresaid figs., the diameter of the wire coils forming the mattress of strands and the distance between the individual strands may be varied to suit the different products to be treated.

The material to be treated is fed onto the left-hand end of the upper pass 21 of the mattress of strands, either before they pass over the grooved roller 22 or just after they pass over it. The strands of the upper pass 21 with the material on them move forward until the strands reach the driven grooved roller 23. At this point the groups of the strands separate from one another. One group continues in straight line and passes over the grooved roller 24. A second group passes downwardly and over the grooved roller 25. A third group passes downwardly at a greater angle than the first group and passes over the grooved roller 26. A fourth group passes downwardly at a still greater angle and under the grooved roller 27 and then continues in a substantially horizontal direction and over the grooved roller 26. The groups of strands which passed over the grooved rollers 24 and 25 pass downwardly and around the grooved roller 26 so that as the four groups of strands pass around the grooved roller 26 they are again combined into a single mattress of strands which move, as a lower pass 28 to the right. The separation of the strands into the four groups as they passed over the roller 23 results in a sevenfold increase in the distance between the several strands of each group, assuming that the space between adjacent strands is equal to the diameter of the strands, so that the material falls between the strands of the several groups onto the lower pass 28.

The strands of the lower pass, with the material thereon, move to the right until the strands reach the grooved roller 29. Here again the strands separate into four groups. One group continues straight forward and passes beneath the grooved roller 30. A second group passes downward at a slight angle and beneath the grooved roller 31. A third group passes downwardly at a greater angle than the second group and beneath the grooved roller 32. A fourth group passes almost straight down and beneath the grooved roller 33 and then passes substantially horizontal and beneath the grooved roller 32. The second, third and fourth groups of wires after passing beneath the grooved rollers 31 and 32, pass upwardly and around the grooved roller 30, where they rejoin the first group of wires, and all the wires then pass upwardly and over the grooved roller 22 to again form the upper pass 21 of the mattress of strands.

As the several strands of the lower pass 28 are divided into the four groups after passing over the grooved roller 29, the spaces between them are increased sevenfold, as at the other end of the unit and the material falls between them onto the upper pass 21' of the conveyor unit B. The conveyor unit B is identical with conveyor unit A, except that the grooved roller 22' is located vertically above the grooved rollers 30', 31', and 32'. Its operation is also identical with that of conveyor unit A so no further description of its operation is necessary.

The material dropping through the separated groups of strands at the right-hand end of the lower pass 28' of conveyor unit B drop onto the upper pass 21'' of conveyor unit C. The structure and operation of conveyor unit C is identical with that of conveyor unit B, so it will not be further described. The material falling through the strands of the several groups at the right of the lower pass 28'' of conveyor unit C fall into a discharge trough 35 from which they are removed from the chamber 20.

While the material to be treated may be fed onto the upper pass of the mattress of strands 21 in any desired manner, I prefer to feed them onto the upwardly-inclined moving mattress of strands 34 between the grooved rollers 30 and 22. This can readily be accomplished by means of the feeding mechanism shown at the right-hand side of the chamber 20. This mechanism comprises an endless conveyor 36 having outwardly-extending material-receiving projections 37. The endless conveyor is trained about the pulleys 38 and 39, one of which is driven. The conveyor 36 is mounted in a casing 40 having an opening at its lower end to receive the material to be treated from a hopper 41. As the projections 37 with the material on them pass about the upper pulley 38 and begin their downward movement, the material on them falls through an opening 42 in the end wall of the chamber 20 onto the downwardly-inclined shelf 43, from which they slide onto the mattress of strands passing from the grooved roller 30 to the grooved roller 22.

The material in passing along the upper pass of conveyor unit A is first subjected to a blanching treatment, which takes place in the first half of its travel towards the grooved roller 23, and then to a cooling treatment. To accomplish the blanching, steam pipes 44 are positioned beneath the first half of the upper mattress of strands 21 and cause a heating of the material to a temperature of from about 195° F. to 212° F.

As the material continues its movement along the second half of the mattress of strands 21, it is cooled to a temperature of from about 40° F. to 60° F. This may be accomplished in any manner, such as by the upward passage of a cooling gas through the material as it moves along this portion of the mattress of strands. The chamber 20 is provided with a series of exhaust ports 45 in its side wall above the cooling section of the upper pass 21 of the mattress of strands, but there are no similar exhaust ports in the side walls of the blanching section.

There will be some condensation of moisture resulting from the blanching and subsequent cooling of the material as it is moved along by the upper pass 21 of the mattress of strands. This is caught by a pan 46 which extends the full width of the upper pass and substantially the full distance between the grooved rollers 22 and 23. Collected condensate is withdrawn from the pan 46 through the outlet 47 and discharged from the chamber 20 in any manner.

After the material leaves the cooling section of the upper pass 21 and travels back and forth and downward through the chamber to the discharge trough 35, it is subjected to controlled drying in different stages and finally to cooling so that the material discharged from the chamber through the trough 35 will not be undesirably hot. This controlled drying and cooling of the material is obtained by the passage of aeriform fluid at controlled temperatures upwardly through and across the material as it passes back and forth through the chamber 20.

The speed of the mattresses of strands of the respective conveyors A, B and C, and the feed of the material to the upper pass of conveyor unit A is so controlled that the bed of material on the upper pass of conveyor unit A will be from about one-half to one inch thick and the material will remain in each of the blanching and cooling sections from about two and one-half to five minutes. The bed of material on the lower pass 28 of this unit will be of like thickness and it remains thereon for from five to ten minutes.

On the upper and lower passes of conveyor unit B, the thickness of the bed of material will be from about one and one-half inches to three inches, and the material will remain on those passes from about sixteen to forty-eight minutes.

On the upper and lower passes of conveyor unit C, the thickness of the bed of material will be from about three to four inches, and the material will remain on those passes for a period of from about forty-eight to one hundred and forty-four minutes.

As will be noted from FIG. 8, the layers of material on the upper and lower passes of the several conveyor units form, in effect, transverse horizontal partitions in the chamber 20. These are used to control the flow of fluid through the chamber and through and over the material being treated.

The fluid for treating the material is introduced into the chamber 20 beneath the lower pass of the mattress of strands of conveyor unit C and all of it is caused to pass upwardly through the material on that pass. Thereafter, it is caused to take primarily a zig-zag course upwardly through the chamber and to be discharged through an opening in the side wall of the chamber located between the upper and lower passes of the mattress of strands of the top conveyor unit A.

Still referring to FIG. 8, vertical walls 48 and 49 extend along the edges of the upper and lower passes of the conveyor units A, B and C. These walls enclose the conveyor units and prevent material from falling off the edges of their upper and lower passes. They also assist in obtaining a desired flow of treating fluid across the material on the several passes of the conveyor units, as will hereinafter be described. The walls 48 and 49 are spaced from the side walls 20ª and 20ᵇ of the chamber 20 to provide fluid pasages. Heat-exchange pipes 50, 51, 52 and 53, which may be finned, are positioned in the fluid passages formed by the walls 48 and 49 and the side walls 20ª and 20ᵇ.

The wall 48 is interrupted at 54, 55, 56 and 57 to provide fluid passages. The interruptions 54 and 56 are located above and adjacent the upper passes 22′ and 22″ of the conveyor units B and C and at a horizontal position only slightly above the top level of the material on those passes. Interruption 55 is located just below the upper pass 22′ of conveyor unit B; while interruption 57 is located just below the condensate-collecting pan 46.

Wall 49 is provided with interruptions 58, 59, 60 and 61 to provide fluid passages. Interruptions 58 and 60 are located above and adjacent the lower passes 28′ and 28″ of conveyor units B and C and at a horizontal position only slightly above the top level of the material on those passes; while interruptions 59 and 61 are located just below the lower passes 28 and 28′ of conveyor units A and B.

Battens, or filler strips 62 are placed between the walls 48 and 49 and side walls 20ª and 20ᵇ opposite each side of the lower pass of conveyor unit C, opposite the right side of the upper passes 22′ and 22″ of conveyor units B and C and opposite the left side of the lower passes 28 and 28′ of conveyor units A and B.

The upper portion of the side wall 20ᵇ has a fluid outlet 63 located horizontally between the top of the material on the lower pass 28 and the bottom of the condensate-collecting pan 46. The outlet 63 communicates through a conduit 64 to a blower or pump for causing a flow of the treating fluid upwardly through the chamber 20.

The battens by blocking off the fluid spaces between the respective walls 20ª and 20ᵇ and the walls 48 and 49, and the arrangement of the interruptions in the walls 48 and 49, as described above, cause the treating fluid, after passing upwardly through the material on the lower pass of the lowermost unit, to pass back and forth and upwardly through the chamber 20, in a generally zig-zag course, during which it is caused to flow over the several groups of heating coils and over the material on each of the passes of the three conveyor units, as indicated by the arrows in FIG. 8. The material on the several passes prevent fluid flow directly upwardly through the chamber 20, although there probably is some passage of the fluid upwardly through the material on the several passes. This actually will facilitate the drying of the material.

In the operation of the treating plant shown in FIGS. 7 and 8, the material passing through the blanching zone on the first part of the upper pass 22 is heated to a temperature approaching 212° F., and as the material passes through the cooling zone at the left end of the upper pass it is cooled to between about 40° F. to 60° F. As the material passes along the lower pass 28 it is subjected to drying by contact with gases at a temperature of about 350° F. Thereafter the material is subjected to drying with gases heated to successively lower temperatures. The beds of the material on the upper and lower passes of the second conveyor unit B will be subjected to drying with gases heated to a temperature of about 200° F., and to gases at a temperature of about 150° F. on the upper pass of the lower conveyor unit C. On the lower pass of the latter unit, unheated air at room temperature, about 60° F. will pass through the material and cool it to substantially that temperature before it is discharged from the discharge trough 35. Thus, the material is dried at successively lower temperatures until it is discharged from the plant at approximately room temperature.

The drying of the material with the hot gases reduces substantially the temperature of the gases, but the desired temperature of the treating gases passing over each bed of the material is controlled by the extent to which they are heated or reheated by the several groups of heating coils over which the gases must pass in passing between the several walls at the edges of the different passes of the conveyor units and the side walls of the chamber 20.

The present invention will, for the first time, permit the blanching of fruit and vegetable material on a continuous basis by means of heat conveyed to the product, not only by the traditional means of hot water or steam, but by means of hot air, or by contact heat, or by radiant heat, sustained within a chamber enclosing the moving mattress and itself closed by sleeve or star valves at its entrance and exit.

The blanching or cooking of fruits and vegetables by air, as opposed to steam or water, has presented special difficulties, in that attempts to use hot air as the operating medium have been defeated by the tendency of the hot air to evaporate the water from the product and so to reduce the product temperature rather than to convey heat to the product without serious evaporation. According to the present invention, it is found possible and certainly advantageous, to avoid the many serious leaching losses referred to, by the use of air as the vehicle for the communication of the blanching heat in whole or in part, because it is possible to seal the blanching chamber in the manner described, and the air will therefore be brought under enclosure or pressure and rapidly reach its saturation point, thus preventing further evaporation taking place and removing the principal difficulty standing in the way of attempts heretofore to carry out the blanching or cooking by hot air. Obviously other forms of heating, for example radiant heat, may be used to supply part or the whole of the total requirement of heat for blanching or cooking.

The method of supplying heat or extracting heat for the various purposes described are obviously many. The apparatus is convenient for the application of radiant heat or convection heating, and conductivity may be employed by or through, for example, the wires forming the conveyor mattress. Fans may be added to induce or regulate the draft of air or to impart the advantage of turbulence.

It will be appreciated that the method and apparatus hereinbefore described are applicable not only to the treatment of fruits and vegetables but to the treatment of many other products and materials.

It will also be appreciated that various changes may be made in the forms of apparatus disclosed herein without departing from the scope of the invention or sacrificing any of the advantages thereof.

I claim:

1. A conveyor comprising a plurality of horizontally-spaced rollers, means rotatively supporting said rollers, a mattress of endless strands trained about said rollers, means for causing said strands to move about said rollers in an endless path, said rollers being disposed to cause the endless strands passing about them to form an upper material-carrying pass in which all of the strands are moving in substantially the same plane, means adjacent the discharge end of the upper pass for deflecting certain of said strands relative to the other strands so that the width of the transverse spaces between the strands is increased, and means located laterally beyond the line of deflection of said strands, in the direction of movement of the strands for regrouping all of the strands to form a lower material-carrying pass in which all of the strands are moving in substantially the same plane and in the opposite direction from the strands of the upper material pass, said lower material-carrying pass being positioned in part beneath said deflected strands, the space between the deflected strands and the underlying regrouped strands being sufficiently unobstructed to permit material falling through the transverse spaces of increased width of the upper pass, caused by the deflection of certain of the strands thereof, to fall upon the lower material-carrying pass and to be carried thereby in the opposite direction.

2. A conveyor as set forth in claim 1 in which the rollers are grooved and the strands are located in the grooves.

3. A conveyor as set forth in claim 1 in which the strands are wire coils.

4. A conveyor as set forth in claim 1 in which said lower pass has a discharge end and includes means adjacent the discharge end of the lower pass and horizontally spaced from the means for regrouping the strands for deflecting certain of the strands relative to other of the strands so that the width of the transverse spaces between the strands is increased and material conveyed by said lower pass may fall through the spaces of increased width and be discharged from the conveyor.

5. A conveyor as set forth in claim 1 in which the strands are deflected in several groups, with each group being deflected at a different angle to the plane of the upper material-carrying pass.

6. Apparatus for treating material comprising a housing, at least two conveyor units positioned in said housing in superposed relation, each conveyor unit comprising a plurality of horizontally-spaced rollers, means rotatively supporting said rollers, a mattress of endless strands trained about said rollers, means for causing said strands to move about said rollers in an endless path, said rollers being disposed to cause the endless strands passing about them to form an upper material-carrying pass in which all of the strands are moving in substantially the same plane, means adjacent the discharge end of the upper pass for deflecting certain of said strands relative to other of the strands so that the width of the transverse spaces between the strands is increased, means located laterally beyond the line of deflection of said strands, in the direction of movement of the strands for regrouping all of the strands to form a lower material-carrying pass in which all of the strands are moving in substantially the same plane and in the opposite direction from the strands of the upper material pass, said lower material-carrying pass being positioned in part beneath said deflected strands, the space between the deflected strands and the underlying regrouped strands being sufficiently unobstructed to permit material falling through the transverse spaces of increased width of the upper pass to fall upon the lower material-carrying pass and to be carried thereby in the opposite direction, and means adjacent the discharge end of the lower pass of the upper conveyor unit and horizontally spaced from the means for regrouping the strands for deflecting certain of the strands thereof relative to other strands thereof to increase the width of the transverse spaces between those strands, the space between the deflected strands of the lower pass of the upper conveyor unit and the underlying pass of the next lower conveyor unit being sufficiently unobstructed to permit material falling between the spaces caused by the deflection of the strands to fall upon the upper pass of the next lower unit.

7. Apparatus for treating material as set forth in claim 6 including means for causing circulation of a treating fluid across the tops of passes of said units.

8. Apparatus for treating material as set forth in claim 7 including vertically-extending walls located at the opposite sides of and confining the upper and lower passes, said walls defining in part fluid passages, said confining walls having openings communicating with spaces between passes of said units, and means for causing a circulation of a treating fluid transversely in a generally horizontal direction through the spaces between said passes and the openings in said confining walls so that such treating fluid takes a generally zig-zag course vertically through said housing.

9. Apparatus for treating material as set forth in claim 8 in which heat-exchange means are positioned in the fluid passages defined in part by said confining walls.

10. Apparatus for treating material as set forth in claim 6 including means located beneath one portion of the upper pass of the uppermost conveyor unit to cause material on that pass to be raised to a blanching temperature.

11. Apparatus for treating material as set forth in claim 10 including means positioned beneath the upper pass of the uppermost conveyor unit for collecting liquid draining through the strands of that pass.

References Cited in the file of this patent

UNITED STATES PATENTS

| | | |
|---|---|---|
| 239,164 | Hinds | Mar. 22, 1881 |
| 937,213 | Hough et al. | Oct. 19, 1909 |
| 1,369,411 | Edwards | Feb. 22, 1921 |
| 1,392,794 | Putnam et al. | Oct. 4, 1921 |
| 1,585,275 | Albrecht | May 18, 1926 |
| 1,568,791 | Aiken | Jan. 5, 1926 |
| 1,726,555 | Gammeter | Sept. 3, 1929 |
| 2,093,061 | Wallace | Sept. 14, 1937 |
| 2,260,587 | Shields | Oct. 28, 1941 |
| 2,452,983 | Birdseye | Nov. 2, 1948 |
| 2,857,042 | Gaubert | Oct. 21, 1958 |